United States Patent [19]

Cathey et al.

[11] Patent Number: 4,586,915
[45] Date of Patent: May 6, 1986

[54] POWER TRANSMISSION SYSTEM AND TOOTHED BELT THEREFOR

[75] Inventors: Thaddeus F. Cathey, Woodbury; Rodney J. Nelson, Southbury, both of Conn.

[73] Assignee: Uniroyal Power Transmission Company, Inc., Middlebury, Conn.

[21] Appl. No.: 570,156

[22] Filed: Jan. 12, 1984

[51] Int. Cl.⁴ ............................................. F16G 1/28
[52] U.S. Cl. .................................... 474/205; 474/153
[58] Field of Search ................ 474/153, 205, 202, 250

[56] References Cited

U.S. PATENT DOCUMENTS

| | | | |
|---|---|---|---|
| 2,507,852 | 5/1950 | Case | 474/205 X |
| 2,934,967 | 5/1960 | Worrall | 474/153 X |
| 3,078,206 | 2/1963 | Skura | 474/205 X |
| 3,756,091 | 9/1973 | Miller | 474/205 X |
| 4,037,485 | 7/1977 | Hoback | 474/153 X |
| 4,233,852 | 11/1980 | Bruns | 474/205 X |
| 4,371,363 | 2/1983 | Cicognani et al. | 474/205 |

Primary Examiner—James A. Leppink
Assistant Examiner—Frank McKenzie
Attorney, Agent, or Firm—Jack Posin

[57] ABSTRACT

A synchronous power transmission system and a toothed belt therefor. The belt having convex curvilinear flanks shaped to minimize the generation of unpleasant sound resulting from meshing of such belt with a pulley.

20 Claims, 4 Drawing Figures

POWER TRANSMISSION SYSTEM AND TOOTHED BELT THEREFOR

BACKGROUND OF THE INVENTION

This invention relates to synchronous power transmission systems and toothed belts therefor. Synchronous drive systems of this type are used extensively in industry and particularly in the automotive industry for driving cam shafts and auxiliaries on engines.

More particularly, the present invention is concerned with a toothed belt having teeth whose profiles are defined by curvilinear lines and with a combination of such belt with a pulley having grooves and teeth which are generally trapezoidal in cross section. In prior art systems of this type as for example in systems which comprise a belt having teeth of trapezoidal cross-section and a pulley having grooves of trapezoidal cross-section as specified, for example, in the "Timing Belt Drive Engineering Handbook" by R. Y. Case, McGraw Hill Book Co. Inc. 1954, the belt is likely to generate unpleasant sounds when its teeth engage the pulley grooves or disengage therefrom. Depending on the shape of the belt teeth and/or the engaged relationship between the belt teeth and the pulley, engagement and disengagement causes vibration of the belt. In the event a driving shaft, a driven shaft, an idler shaft, or any other element surrounding the pulley has a natural frequency which is the same or a multiple of the frequency of the belt vibration, resonance occurs and generates unpleasant sounds. When such a device is employed in an automobile engine or in a similar engine, it is particularly true that resonance often occurs in some portion of the speed range of the engine and generates unpleasant noise.

In order to overcome these disadvantages, there has been developed a drive system in which the belt teeth have a height greater than the depth of the pulley grooves and are adapted to be compressibly engaged therein, as disclosed in U.S. Pat. No. 4,037,485. According to this system, the tooth tips of the belt teeth are compressibly deformed by the bottom surface of the pulley grooves so that they decrease in height. The belt teeth, according to that system, are complementary in shape to the pulley grooves and contact the entire surface thereof. The slanted flanks of the belt teeth contacting the corresponding slanted flanks of the pulley grooves have a surface area enlarged to the maximum possible extent, so that a low contact pressure may be maintained therebetween in an effort to reduce all other tooth deformation. Accordingly, the belt teeth have only a limited degree of freedom for compressive deformation in the pulley grooves. Such belt teeth fail to sufficiently absorb impact and thus substantial noise is generated when each belt tooth engages and/or disengages from a pulley groove. Some of that noise is of the type which is classified as unpleasant noise by a majority of the car buying public.

According to another known synchronous drive system, that described in U.K. Patent Application GB No. 2084688 (Mitsubishi) a standard trapezoidal pulley is used in conjunction with a belt whose teeth, in cross-section, are defined by straight lines which occupy 60% to 95% of the total tooth height and a tooth crest formed by an arc whose center of curvature is on the centerline of the tooth. Here again the tooth flanks are flat trapezoidal shapes resulting in problems similar to those described above. This belt relies upon "bottoming", as described above, in order to achieve some impact absorption. However, manufacturing tolerances of both the belts and the pulleys may result in the belt teeth having a height shorter than the depth of the pulley groove, in which event the teeth will not bottom and will act as conventional trapezoidal teeth.

Another known belt is that described in U.S. Pat. No. 4,371,363 to Cicognani, et al. The belt teeth according to this patent have arcuate convex flanks defined by the relationship that the trigonometric tangent of the curved flank increases linearly from the tip end of the tooth toward the base thereof. This belt also does not provide a satisfactory solution to the problem of unpleasant noise generated as a result of certain belt vibration when in driving or driven engagement with a pulley.

Moreover, many other types of toothed belts are known with teeth having a curved profile that is formed by combining arcs of a circle with rectilineal portions or with involute profiles, but even those known belts vibrate when employed in transmission systems of the type referred to above. No successful means for solving the problem of vibration resulting in unpleasant noise has been found up to this time.

It is therefore an object of the present invention to improve the shape of the belt teeth such that the impact of meshing is absorbed as the belt teeth mesh with their mating pulley grooves resulting not only in reduced belt vibration but less generation of unpleasant noise.

It is also an object of the invention to provide an improved power transmission system which minimizes the generation of unpleasant sounds due to vibration resulting from meshing between the belt teeth and the pulley grooves.

Industrial manufacturers, particularly automobile manufacturers have experts, sometimes known as "noise engineers" who are able to distinguish the different forms of noise and are able to agree on the quality of noise which is acceptable to the buying public.

According to the present invention there is provided an endless flexible power transmission belt having a plurality of teeth separated by grooves. Each tooth in longitudinal cross-section is symmetrical about a tooth center line and includes a root portion, a tip portion and opposite convex curvilinear flank portions extending between said tip portion and said root portion. The root portion is defined by a first and a second arc each approximating the arc of a circle on opposite sides of the tooth center line and extending into the corresponding flank portions of the tooth and each said groove has a base portion on the belt land line connecting said first arc of one tooth with said second arc of the next consecutive tooth, said tooth having a height measured between the extremity of said tooth tip portion and said belt land line and has a width measured between said opposite flank portions along a width line parallel to said belt land line at a distance therefrom of approximately 40% to 50% of said tooth height. Each of said opposite convex curvilinear flanks is formed such that when an imaginary line passing through the point at which the corresponding one of said first and second arcs intersect the flank portion in question, drawn at an angle of between 19° and 25° with respect to said tooth centerline and intersecting said flank, it will intersect said width line at a point located between 94% and 98% of the distance from said centerline to the surface of the convex curvilinear flank as measured along said width line.

According to the present invention there is also provided a power transmission system including a flexible drive belt having a series of spaced teeth which are substantially curvilinear in longitudinal cross-section, in meshing engagement with a pulley also having a plurality of teeth separated by grooves, each pulley groove having a longitudinal cross-sectional contour that is substantially trapezoidal in shape.

The curvilinear belt tooth flank according to the present invention is preferably shaped such that the initial contact with the pulley groove flank occurs at a point on the profile of the belt tooth flank spaced from the belt land line a distance equal to approximately 45% of the belt tooth height and a point on the pulley groove flank spaced from the periphery of the pulley a radial distance equal to approximately 45% of the pulley groove depth. Furthermore, as the belt tooth according to the present invention continues to mesh with the mating pulley groove the curvilinear belt tooth flank is compressively deformed to the extent that the one-half tooth width as measured along said width line is reduced by an amount equal to approximately 4% of said one-half tooth width.

The initial point contact between the belt tooth and pulley groove flanks in combination with the continuing belt tooth flank compressive deformation during meshing is believed to have a belt vibration dampening effect resulting in a lower incidence of generating unpleasant sound.

BRIEF DESCRIPTION OF THE DRAWINGS

The invention will be better understood from the following specific description given in conjunction with the accompanying drawings in which.

DETAILED DESCRIPTION OF THE INVENTION

Figure 1:
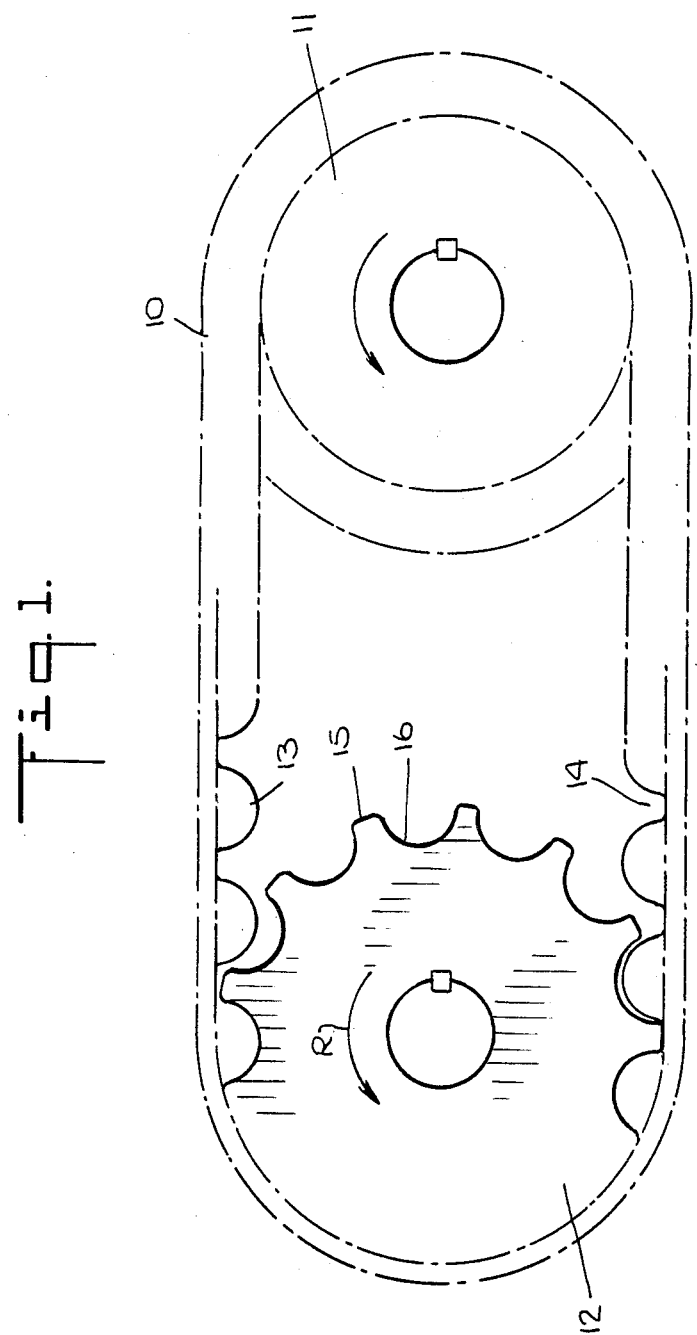
FIG. 1 is a partly schematic view looking transversely of the positive drive system of the present invention showing a belt in engagement with a pair of cooperating pulleys.

As seen in FIG. 1 an endless belt 10 engages driving and driven pulleys 11 and 12. U.S. Pat. No. 2,507,852 to Case, U.S. Pat. No. 2,934,967 to Worrall and U.S. Pat. No. 3,756,091 to Miller may be consulted for a more detailed description of this general class of toothed belt and pulley system and the construction thereof. The entire contents of the Case, Worrall and Miller patents are hereby incorporated herein by reference. The belt 10 may be made in any one of a number of ways, but it is preferable to use the method described in U.S. Pat. No. 3,078,206 to Skura, the entire contents of which patent are also incorporated herein by reference. An alternative method for manufacture of the belt is described in the aforesaid Case Patent.

Figure 2:
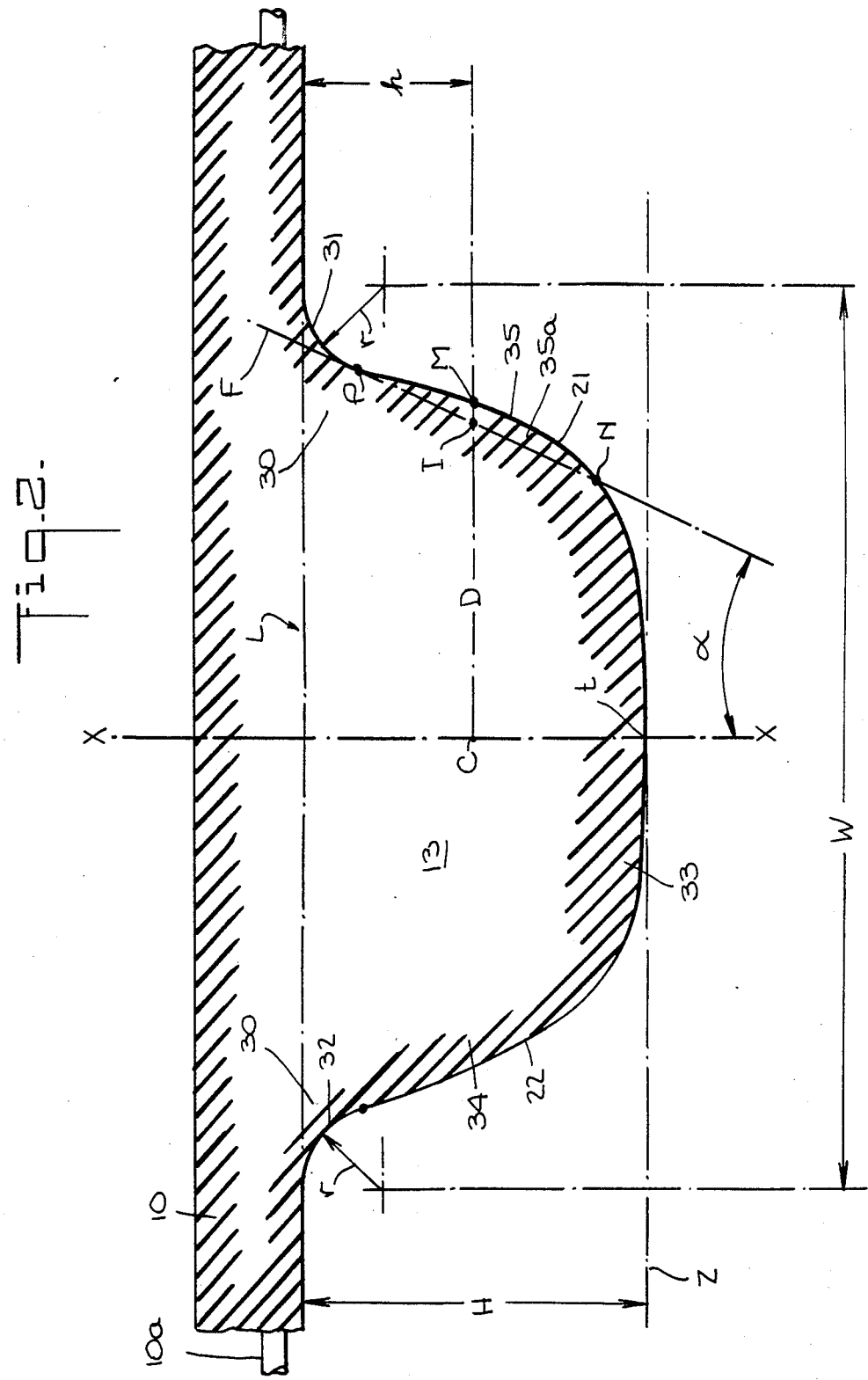
FIG. 2 is an enlarged fragmentary longitudinal cross-sectional view of a belt in accordance with the present invention showing the profile of a tooth.

FIG. 2 shows a typical belt tooth 13, according to the present invention, having a substantially U-shaped longitudinal cross-sectional profile symmetrical with respect to a tooth centerline X—X. Each tooth 13 has root portions 30 adjacent land line L of belt 10, a tip portion 33 spaced from land line L and a pair of symmetrical opposed flank portions 34, 35 intermediate said root and said tip portions and having a profile formed by curved lines 21 and 22, respectively. The root portions of each tooth 13 are defined by first and second symmetrical circular arcs 31 and 32 of radius "r", centered on a line spaced a distance "r" from, and parallel to, the land line L. The furthest extremity of the tip portion 33 from the land line L is at a point "t" on the tooth centerline X—X. Preferably, the convex curved flanks represented by lines 21 and 22 are each defined by a polynomial equation with powers which are positive rational numbers with at least one of those powers being greater than 2.0. The curved lines 21, 22 which represent the profiles of the opposed symmetrical flanks 34, 35 according to the present invention extend, in accordance with such polynomial equation, to the apex "t" of the tooth where the lines 21, 22 preferably meet, each being asymptotic to a line Z which is parallel to, and spaced from the land line L of the belt 10 by a distance H representing the height of the tooth 13.

In accordance with the present invention a line D drawn through the tooth 13 parallel to and spaced a distance "h" from the land line L of the belt intersects the centerline X—X at a point C and intersects the curve 21 of the tooth flank 35, at a point M. The distance "h" is equal to 40% to 50% of the tooth height H.

The particular convex curvilinear shapes of the flanks 34, 35 as defined by the curves 21, 22 provide a cushioning effect, in use, the effect of which can best be understood by looking at the amount and shape of the cushion portion 35a of the tooth, i.e., the portion designated by the points P-M-N in FIG. 2 which is located beyond an imaginary line F drawn at an angle generally representative of the flank surface of a conventional trapezoidal belt. As seen in FIG. 2, the imaginary line F is preferably drawn through the point P at which the root arc 31 of radius r intersects the curve 21. Imaginary line F may be drawn at an angle "α" between 19° and 25° with respect to the vertical centerline X—X, and will intersect line D at a point "I" spaced from point C on the centerline a distance equal to 94% to 98% of the total length of the line segment C-M. Preferably the distance "h" is equal to approximately 45% of the height H of the tooth 13 and the angle "α" is approximately 20°. Point M represents the point at which belt tooth 13, according to the present invention, will initially contact the pulley groove flank of a conventional trapezoidal pulley as will be described later.

Figure 3:
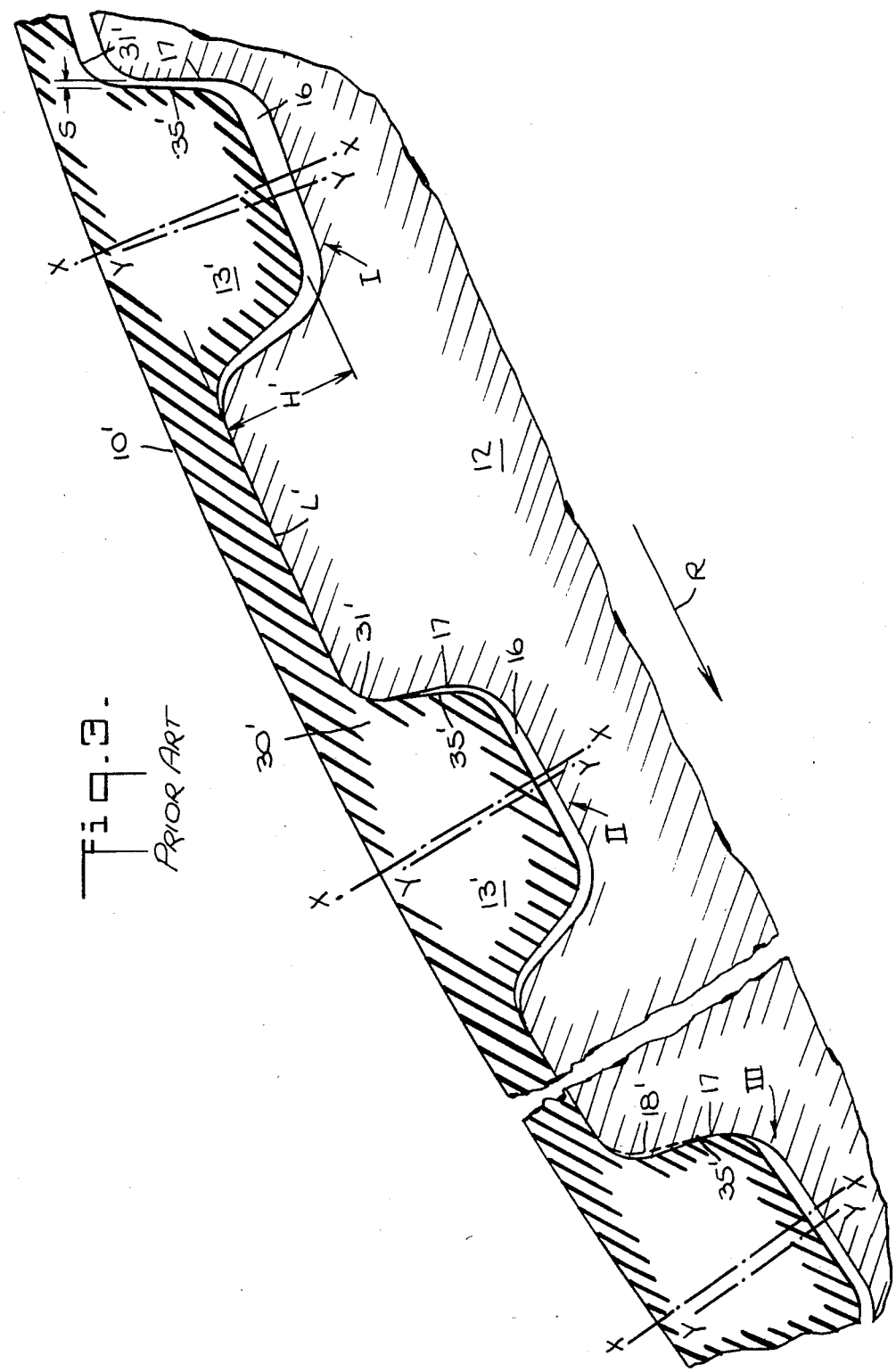
FIG. 3 is a fragmentary longitudinal cross-sectional view of a positive drive system according to the prior art showing a belt with trapezoidal teeth in various stages of engagement with a pulley having trapezoidal grooves.

Referring now to FIG. 3, there is illustrated a conventional trapezoidal pulley 12 in mesh with a conventional, trapezoidal belt 10', of the type commonly used in automobiles, for example ⅜" pitch trapezoidal belt and a 38 groove ⅜" pitch trapezoidal pulley. The tooth 13' of belt 10' and the groove 16 of the pulley 12 are shown in three sequential positions I, II, III thereof, with pulley rotation in the direction of arrow "R". According to such prior art systems, initial contact between belt tooth 13' and pulley groove 16 does not occur until the belt and pulley grooves are in position II thereof. In that position initial contact will occur between belt and pulley in the region of the intersection of the belt tooth root 31' and the belt tooth flank 35'. Prior to the time of such initial contact, as for example in the position I in FIG. 3, no portion of the belt tooth flank 35' is in contact with the pulley groove flank 17 as seen by the clearance space "S". As additional load is applied to the prior art system of FIG. 3, the belt tooth root region defined by the arc 31' is loaded, resulting in high stress concentration in that area. As a result, the root region 30' is deformed, as seen in the position III condition in FIG. 3, an amount indicated by the dotted line 18' before the flank portion 35' comes into full contact with the flank 17 of the pulley groove 16. It will be seen that in going from the initial contact condition, i.e. the position II condition in FIG. 3, to the fully loaded condition, i.e. the position III condition, a high stress concentration is built-up in the root region 30' of the prior art belt 10'.

Figure 4:
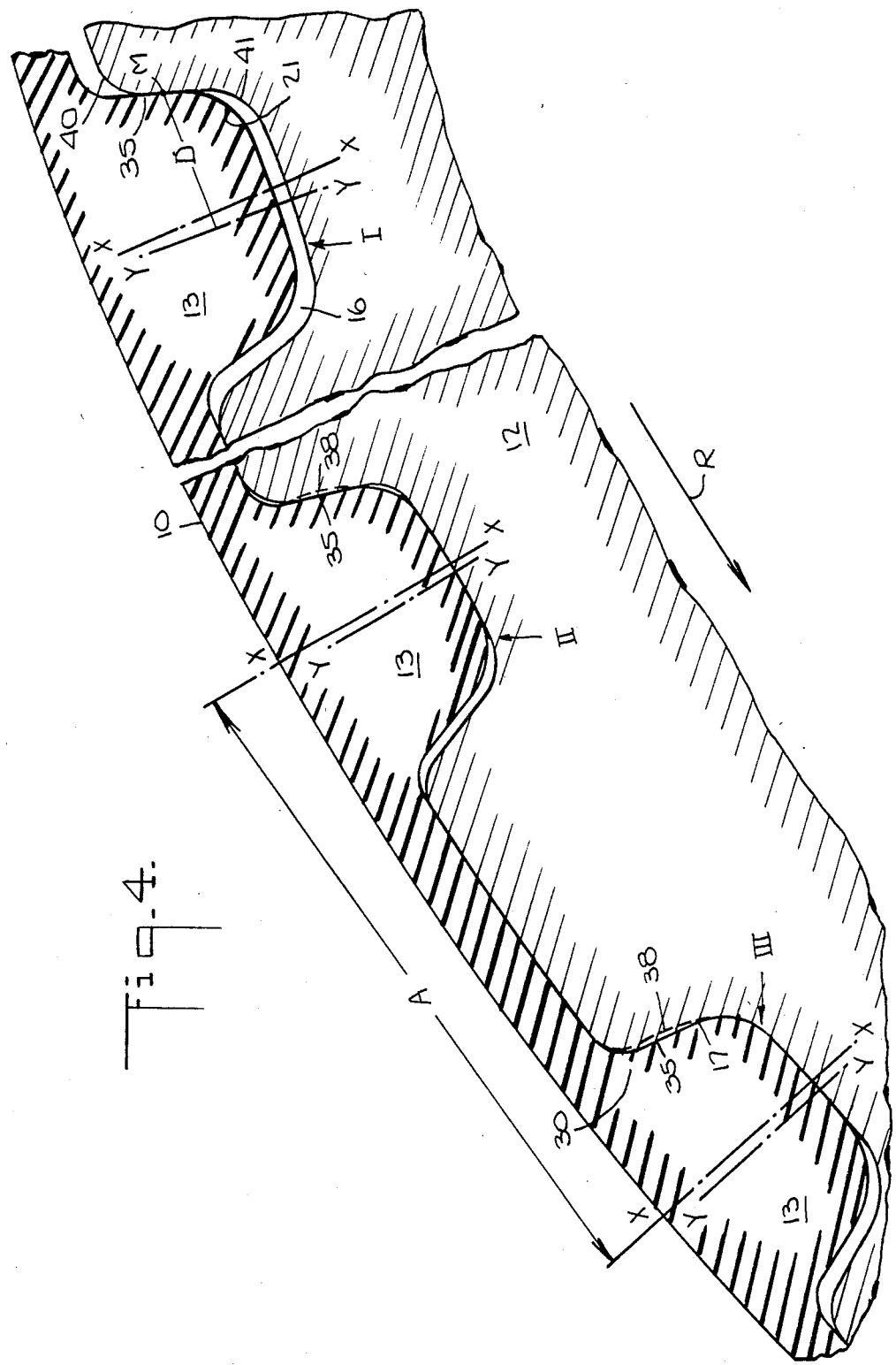
FIG. 4 is a fragmentary longitudinal cross-sectional view of the belt and pulley combination according to the present invention showing the latter in various stages of engagement.

Referring now to FIG. 4, there is shown a belt 10 having teeth 13, according to the present invention, in engagement with a conventional trapezoidal pulley 12 having grooves 16. The initial engagement, according to the present invention occurs at the point M on flank 35 represented in longitudinal cross-section by curved line 21. At the time of this initial contact which in this case is shown at position I in FIG. 4, it will be seen that there is substantial clearance between the root region 30 of the belt tooth 13 and the pulley tooth tip 40. As the belt tooth 13 according to the present invention moves on the pulley from position I to position II, as seen in FIG. 4 of the drawings, the flank 35 of the belt tooth 13 continues to be loaded without stressing the root region 30. Thus, full flank contact, as seen in position III in FIG. 4, is achieved with hardly any stress on root region 30. In position III the dotted line 38 indicates the position of the flank 35 of the tooth 13 had it not been flattened out due to contact with the flank 17 of the groove 16 of the pulley. It will be understood, of course, that with the loading shown in position III of FIG. 4, the actual position of the flank 35 of the tooth 13 is the compressed, i.e. deformed, position in face-to-face contact with flank 17 of the pulley groove. The portion shown by the dotted line 38 in FIG. 4 therefore represents the amount of cushioning compression resulting from the belt and pulley system in accordance with the present invention.

Preferably the results of the present invention are achieved by providing belt teeth with convex curvilinear portions preferably having teeth whose profiles, including both the flank portion 35 as well as the tip portion 33 thereof, are defined by a polynomial equation with powers which are positive rational numbers with at least one of those powers being greater than 2.0, of the form:

$$y = \sum_{i=1}^{n} a_i (X + K)^{b_i}$$

where:
 i is a subscript designating the term number,
 $a_i$ is a positive or negative rational number,
 $b_i$ is a positive or negative rational number and at least one of the $b_i$ terms must be greater than 2.0,
 K is a positive or negative rational number, and
 n is a positive integer greater than 1.

By way of example, if a $\frac{3}{8}$" pitch belt is designed according to the preferred embodiment of the present invention, illustrated in FIGS. 2 and 4, and using standard design practice, the belt dimensions are as follows:

| | |
|---|---|
| Pitch (A) = | 0.375" |
| Tooth Width (W) = | 0.205" |
| Root Radii (r) = | 0.020" |
| Land Length (Ld) = | 0.170" |
| Tooth Height (H) = | 0.084" |
| Angle "α" = | 20° |
| "h" distance from Land Line (0.45H) = | 0.0376" |
| Flank Equation: | |
| $y = 0.35978 \, X^2 + 885.04 \, X^4 + 98,214,000 \, X^{8.888}$ | |
| Segment C-M = | 0.077" |
| Segment C-I = | 0.074" |

The pulley 12 shown in FIGS. 3 and 4 is a conventional trapezoidal pulley such as disclosed in the previous R. Y. Case reference, having a generally trapezoidal groove profile with substantially planar flanks. The dimensions of a typical 38 groove pulley of this type are as follows:

| | |
|---|---|
| Pitch = | 0.375" |
| Bottom Width = | 0.133" |
| Groove Depth (Hp) = | 0.084" |
| Top Radius (40) = | 0.022" |
| Bottom Radius (41) = | 0.045" |
| Included Angle (θ) = | 40° |
| ½ PLD = | 0.027" |
| Pulley Diameter = | 4.482" |

As belt tooth 13 in FIG. 4 moves from position I to position III its curvilinear flank 35 is progressively compressed to the extent that the length of line CM is reduced to approximately 96% of its undeformed length. The belt tooth of the example in combination with the pulley groove of the example described above, results in an actual compressive deformation of the belt tooth flank, as measured along the line D, of about 3.9%.

With regard to noise testing the velocity of the driving pulley was varied within the range of 800 to 5000 revolutions per minute. The belts tested were tested under these identical conditions. Experimental tests were carried out with toothed belts according to the present invention and with toothed belts having similar structure as those of the toothed belt of the present invention but with the exception that the teeth of such belts had a trapezoidal profile with substantially flat sides. The same conventional trapezoidal pulleys were used for testing both sets of belts. The results obtained from these experiments, were as follows:

The "quality" of the noise generated by the belts according to the invention was substantially better than that of the prior art trapezoidal belts in the range of the aforesaid velocities examined. The quality of the noise generated was determined on a subjective basis by trained noise engineers. They found the belt and pulley systems according to the present invention to be highly preferred over the conventional trapezoidal belt and pulley systems and over the so called HTD ® power transmission systems, with regard to the quality of the sound generated thereby.

While the applicants do not wish to be limited by any statement describing the theory behind their invention, it would appear that by providing a cushion 35a as described herein, having the shape P-M-N seen in FIG. 2, it is possible to displace the initial point of contact between belt tooth 13 and pulley groove 16 from a location in the region of the root arc 31 of the belt tooth 13 to substantially the single point M spaced a distance "h" (i.e. about one-half the tooth height H) from the land line L. By providing the aforesaid cushion on the flank 35 of belt tooth 13, it is further possible to increase the surface area of contact between belt tooth flank and pulley groove flank in response to increased load between the belt and the pulley, thus, tending to flatten out the curve 21 as such increased load is applied with respect to initial contact point M. It is believed that as a result of this cushioning effect the power transmission system according to the present invention exhibits substantially less generation of unpleasant sounds.

Preferably the base material for belt 10 is a resilient elastomer reinforced by a longitudinal tension member 10a made up usually of a plurality of parallel cords of a very high elastic modulus. These cords are centered on the neutral axis of the belt and define, by their position, the pitch line of the belt. These cords may be made from fiberglass, steel, polyester, polyamid, or high tenacity rayon. The tooth face may, if required, be reinforced with an abrasion resistant fabric, an example of which is nylon. The belt may be made from a variety of elastomers including polychloroprene, polyurethane and acrylonitrile rubber. The pulleys may be made from a variety of materials including metals.

While certain representative embodiments and details have been shown for the purpose of illustrating the invention, it will be apparent to those skilled in this art that various changes and modifications may be made therein without departing from the spirit or scope of the invention.

What is claimed is:

1. An endless flexible power transmission belt having a plurality of teeth separated by grooves, each tooth in longitudinal cross-section being symmetrical about a tooth center line and including a root portion, a tip portion and opposite convex curvilinear flank portions extending between said tip portion and said root portion, said root portion being defined by a first and a second arc each approximating the arc of a circle on opposite sides of said tooth center line and extending into the corresponding flank portions of the tooth and each said groove having a base portion on the belt land line connecting said first arc of one tooth with said second arc of the next consecutive tooth, said tooth having a height measured between the extremity of said tooth tip portion and said belt land line and having a width measured between said opposite flank portions along a width line parallel to said belt land line at a distance therefrom of approximately 40% to 50% of said tooth height, each said opposite convex curvilinear flank being formed such that when an imaginary line drawn at an angle of between 19° to 25° with respect to said tooth centerline and passing through the point at which the corresponding one of said first and second arcs intersect the flank portion in question it will intersect said width line at a point located between 94% and 98% of the distance from said centerline to the surface of the convex curvilinear flank portion in question as measured along said width line.

2. A power transmission belt according to claim 1 in which said angle is approximately 20° and said point at which said imaginary line intersects said width line is located from said centerline a distance equal to approximately 96% of the distance from said centerline to the corresponding flank portion as measured along said width line.

3. A power transmission belt according to claim 2 in which said width line is spaced from said land line a distance equal to approximately 45% of said tooth height.

4. A power transmission belt according to claim 1 in which each said flank portion and the part of said tip portion extending from said flank portion to said extremity of said tip portion together comprise a continuous curve defined by a mathematical equation of at least the third power.

5. A positive drive power transmission belt according to claim 4 wherein each said continuous curve responds to the formula: $y = ax^2 + bx^4 + cx^d$, wherein x and y represent the axes of the tooth with the point of intersection of the axes being at the tip of the tooth.

6. A positive drive power transmission belt according to claim 5, wherein $a = 0.35978$, $b = 885.04$, $c = 98,214,000$, and $d = 8.888$.

7. A power transmission belt according to claim 1, wherein said curved forming the opposite sides of each tooth intersect by being asymptotic to a line at said tooth tip parallel to said land line.

8. A power transmission belt according to claim 4 wherein said mathematical equation is a polynomial equation of the form:

$$y = \sum_{i=1}^{n} a_i (X + K)^{b_i}$$

where:
i is a subscript designating the term number,
$a_i$ is a positive or negative rational number,
$b_i$ is a positive or negative rational number and at least one of the $b_i$ terms must be greater than 2.0,
K is a positive or negative rational number, and
n is a positive integer greater than 1.

9. A positive drive power transmission belt according to claim 1 wherein the longitudinal cross-sectional contour of each of said pair of flank portions of each tooth is a continuous curve defined by a mathematical equation of at least the third power.

10. A power transmission belt according to claim 9 wherein said mathematical equation is a polynomial equation of the form:

$$y = \sum_{i=1}^{n} a_i (X + K)^{b_i}$$

where:
i is a subscript designating the term number,
$a_i$ is a positive or negative rational number,
$b_i$ is a positive or negative rational number and at least one of the $b_i$ terms must be greater than 2.0,
K is a positive or negative rational number, and
n is a positive integer greater than 1.

11. A power transmission system comprising (a) an endless flexible belt provided with teeth and grooves at a predetermined pitch along its length, each said tooth in longitudinal cross-section being symmetrical about a tooth center line and including a root portion, a tip portion and opposite convex curvilinear flank portions extending between said tip portion and said root portion, said root portion being defined by a first and a second arc each approximating the arc of a circle on opposite sides of the tooth centerline and extending into the corresponding flank portions of the tooth and each said groove having a base surface on the belt land line connecting said first arc of one tooth with said second arc of the next consecutive tooth, said belt tooth having a height measured between the extremity of said tooth tip portion and said belt land line and having a width measured between said opposite flank portions along a width line parallel to said belt land line at a distance therefrom equal to approximately 40% to 50% of said tooth height, each said opposite convex curvilinear flank being formed such that when an imaginary line, passing through the point at which the corresponding one of said first and second arcs intersects the flank in question, is drawn at an angle of approximately 19° to 25° with respect to said tooth center line and intersecting said flank it will intersect said width line at a point thereon located between 94% and 98% of the distance from said tooth centerline to the surface of said convex curvilinear flank as measured along said width line, and (b) a toothed pulley provided with teeth and grooves at said pedetermined pitch around its periphery, each of said pulley grooves being generally trapezoidal in longitudinal cross-section and having opposite substantially flat flanks each of which corresponds in cross-section to a substantially straight line inclined at an angle with the centerline of said pulley groove which corresponds approximately with the angle of said imaginary line so that when the belt is engaged with the pulley the initial contact between a belt tooth and a corresponding one of said pulley grooves will be substantially a point contact, as seen in longitudinal cross-section, of one flank of the pulley groove with a point on the corresponding belt tooth flank in the region of the intersection of said width line with said surface of said belt tooth flank.

12. A power transmission system according to claim 11 wherein the portion of said belt tooth flank which is on the side of said imaginary line opposite said belt tooth center line is, in longitudinal cross-section, defined by a continuous curve convex with respect to said imaginary line and extending from said root portion to said tip portion of said belt tooth.

13. A power transmission system according to claim 11 in which said flank is a continuous curve defined by a polynomial equation of at least the third power.

14. A power transmission system according to claim 13 wherein said equation also defines the portion of said belt tooth tip portion extending from said flank to the extremity of said tip portion.

15. A power transmission system according to claim 11 wherein said initial contact of said belt tooth flank with said corresponding pulley groove flank is at a point along said pulley groove flank spaced from the periphery of the pulley a distance equal to about 45% of the pulley groove depth as measured from the periphery of the pulley to the bottom surface of the pulley groove.

16. A power transmission system according to claim 15 wherein each said pulley groove has a bottom surface connecting said opposite flanks thereof and a spaced crest portion in the region of the periphery of the pulley defined by a third and a fourth arc each approximating the arc of a circle on opposite sides of a pulley groove centerline and extending into the corresponding flank portions of the pulley groove.

17. A power transmission system according to claim 16 wherein said belt tooth flank is compressed by the corresponding pulley groove flank an amount equal to about 4% of the distance measured along said width line before a substantial portion of the corresponding one of said first and second arcs of said belt tooth root contacts a substantial portion of the corresponding one of said third and fourth arcs of said pulley groove crests.

18. A power transmission system according to claim 11 in which the height of each tooth on the belt is equal to or greater than the depth of each groove in the pulley.

19. A power transmission system according to claim 17 wherein said belt tooth flank is in the form of a smooth arcuate protrusion, with respect to said imaginary line, which will press against the generally flat flank of the pulley groove in driving contact therewith for providing a cushioning effect to reduce the generation of unpleasant noise.

20. A power transmission system according to claim 11 wherein said distance of said width line from said land line is equal to about 45% of said tooth height and said angle of said imaginary line is about 20°.

* * * * *